United States Patent
Takanohashi et al.

(10) Patent No.: US 10,538,187 B2
(45) Date of Patent: Jan. 21, 2020

(54) VEHICLE SEAT CUSHION MATERIAL AND VEHICLE SEAT

(71) Applicant: TS TECH CO., LTD., Asaka-shi, Saitama (JP)

(72) Inventors: Hiroshi Takanohashi, Tochigi (JP); Kensuke Mizoi, Tochigi (JP); Ryuzaburo Abe, Tochigi (JP); Yutaka Kizawa, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/747,977

(22) PCT Filed: Jul. 29, 2016

(86) PCT No.: PCT/JP2016/072365
§ 371 (c)(1),
(2) Date: Jan. 26, 2018

(87) PCT Pub. No.: WO2017/018526
PCT Pub. Date: Feb. 2, 2017

(65) Prior Publication Data
US 2018/0222369 A1 Aug. 9, 2018

(30) Foreign Application Priority Data
Jul. 30, 2015 (JP) .................. 2015-151064

(51) Int. Cl.
*B60N 2/90* (2018.01)
*B60N 2/70* (2006.01)
(Continued)

(52) U.S. Cl.
CPC ............ *B60N 2/90* (2018.02); *B60N 2/686* (2013.01); *B60N 2/70* (2013.01); *B68G 5/02* (2013.01); *B60N 2205/30* (2013.01)

(58) Field of Classification Search
None
See application file for complete search history.

(56) References Cited

U.S. PATENT DOCUMENTS

| 4,571,763 | A | * | 2/1986 | Suzuyama | ............... | A47C 7/18 |
| | | | | | | 297/452.27 |
| 4,728,148 | A | * | 3/1988 | Saito | ...................... | B60N 2/66 |
| | | | | | | 297/284.4 |

(Continued)

FOREIGN PATENT DOCUMENTS

| JP | S47-003463 Y | 2/1972 | |
| JP | 61233513 A | * 10/1986 | ......... B29C 44/1285 |

(Continued)

OTHER PUBLICATIONS

Office Action issued in related application JP 2017-530946, dated Nov. 19, 2019, with machine generated English language translation, 10 pages.

*Primary Examiner* — David E Allred
(74) *Attorney, Agent, or Firm* — Drinker Biddle & Reath LLP

(57) ABSTRACT

A vehicle seat cushion material and a vehicle seat exhibiting excellent moldability and recyclability and providing favorable seating comfortability is described. A cushion material includes a small pad made of resin foam, a pad body integrally stacked on an upper side of the small pad to cover the small pad, made of resin foam, and formed larger than the small pad, and an impregnation layer formed in such a manner that the resin foam of one of the small pad or the pad body is impregnated with an expandable stock solution composition of the other one of the small pad or the pad body and formed at at least a portion of an area between the small pad and the pad body. The impregnation layer is (Continued)

formed on an upper surface and a side surface of the small pad, and the small pad is sterically covered with the impregnation layer.

19 Claims, 11 Drawing Sheets

(51) Int. Cl.
    *B68G 5/02*     (2006.01)
    *B60N 2/68*     (2006.01)

(56) References Cited

U.S. PATENT DOCUMENTS

| | | | | |
|---|---|---|---|---|
| 4,819,288 | A * | 4/1989 | Lowthian | A47C 7/18 297/452.27 |
| 5,630,240 | A * | 5/1997 | Matsuoka | A47C 7/18 297/452.25 |
| 6,226,819 | B1 * | 5/2001 | Ogawa | A47C 7/18 264/46.6 |
| 6,371,562 | B1 * | 4/2002 | Yoshimura | B29C 44/569 156/245 |
| 9,604,549 | B2 * | 3/2017 | Makiguchi | B60N 2/02 |
| 9,962,002 | B2 * | 5/2018 | Nakada | A47C 7/24 |
| 2001/0029628 | A1 * | 10/2001 | Ferrand | A61G 7/00 5/600 |
| 2001/0054200 | A1 * | 12/2001 | Romano | A47C 27/122 5/690 |
| 2002/0145321 | A1 * | 10/2002 | Brightbill | A47C 3/025 297/312 |
| 2004/0237203 | A1 * | 12/2004 | Romano | A47C 27/122 5/713 |
| 2006/0206980 | A1 * | 9/2006 | Hammons | A41D 19/01523 2/160 |
| 2014/0252825 | A1 * | 9/2014 | Amirault | B60N 2/2866 297/250.1 |
| 2017/0174346 | A1 * | 6/2017 | Wilson | B64D 11/0647 |
| 2018/0280216 | A1 * | 10/2018 | Mascull | A47C 27/16 |

FOREIGN PATENT DOCUMENTS

| | | | |
|---|---|---|---|
| JP | 02059329 A | * | 2/1990 |
| JP | 2533618 Y2 | | 4/1997 |
| JP | 2005-059358 A | | 3/2005 |
| JP | 2005-211251 A | | 8/2005 |
| JP | 2007-125099 A | | 5/2007 |
| JP | 2008-228794 A | | 10/2008 |
| JP | 2010-187996 A | | 9/2010 |
| JP | 2013-233625 A | | 11/2013 |
| JP | 2013-233825 A | | 11/2013 |
| JP | 2014-057634 A | | 4/2014 |
| JP | 2015-047217 A | | 3/2015 |

* cited by examiner

VEHICLE SEAT CUSHION MATERIAL AND VEHICLE SEAT

CROSS REFERENCE TO RELATED APPLICATIONS

This application is a National Stage Entry application of PCT Application No. PCT/JP2016/072365, filed Jul. 29, 2016, which claims the priority benefit of Japanese Patent Application No. JP 2015-151064, filed Jul. 30, 2015, the contents being incorporated herein by reference.

BACKGROUND

The present disclosure relates to a vehicle seat cushion material and a vehicle seat. In particular, the present disclosure relates to a vehicle seat cushion material having an impregnation layer with a three-dimensional structure and to a vehicle seat.

For a seat cushion, provided at a vehicle seat, etc., it is common to consider body pressure dispersion of a seated person and a sense of touch of the seated person, etc. for providing a comfortable feeling of seating to the seated person. Considering this point, there is a seat cushion including a polyurethane foam sheet, a polyurethane resin impregnated hardened layer provided as an upper layer of the polyurethane foam sheet and formed with a corrugated surface, and a latex foam sheet formed on the hardened layer (see, e.g., Japanese Utility Model No. 2533618).

In some scenarios, it is difficult to mold the seat cushion with a three-layer structure as described in Japanese Utility Model No. 2533618 because the density of the latex foam sheet is high. For this reason, a seat cushion exhibiting excellent moldability and recyclability and realizing favorable seating comfortability has been demanded without use of an intermediate layer such as the latex foam sheet.

Moreover, the polyurethane resin impregnated hardened layer described in Japanese Utility Model No. 2533618 is formed in a corrugated shape, and is disposed only between the lower polyurethane foam sheet and the upper latex foam sheet. According to this configuration, stiffness in a pitch direction relating to load input upon, e.g., start/stop of a vehicle and stiffness in a roll direction relating to load input upon horizontal oscillation are low. Thus, it is difficult to disperse load input from the outside with a favorable balance. Note that the pitch direction indicates the direction of swing about an axis perpendicular to a vehicle traveling direction, and the roll direction indicates the direction of swing about an axis parallel to the vehicle traveling direction.

SUMMARY

The present disclosure has been made in view of the above-described problem, and various embodiments provide a vehicle seat cushion material and a vehicle seat exhibiting excellent moldability and recyclability and realizing favorable seating comfortability. In addition, embodiments of the present disclosure provide a vehicle seat cushion material and a vehicle seat that enhance stiffness in a pitch direction and a roll direction to disperse the load input from the outside with a favorable balance.

The above-described problem is solved by an embodiment of the vehicle seat cushion material of the present disclosure. The vehicle seat cushion material includes: a small pad made of resin foam; a pad body integrally stacked on a pressure receiving surface side of the small pad to cover the small pad, made of resin foam, and formed larger than the small pad; and an impregnation layer formed in such a manner that the resin foam of one of the small pad or the pad body is impregnated with an expandable stock solution composition of the other one of the small pad or the pad body and formed at at least a portion of an area between the small pad and the pad body. The impregnation layer is formed on a pressure receiving surface and a side surface of the small pad, and the small pad is sterically covered with the impregnation layer.

According to the above-described configuration, a three-dimensional structure is made such that the impregnation layer is formed on the pressure receiving surface and the side surface of the small pad to cover the small pad, and spring-like properties are exhibited. Since the small pad is surrounded by the impregnation layer with the three-dimensional structure, the small pad is less bendable by input to the pressure receiving surface and the side surface in a perpendicular direction (a front-to-back direction, a right-to-left direction, etc.) as compared to the case of not providing the impregnation layer on the side surface, and settling due to long-term use is reduced. Even with thickness and weight reduction, favorable seating comfortability can be provided. Moreover, stiffness of the small pad can be enhanced by the impregnation layer with the three-dimensional structure. Thus, the density of the resin foam of the small pad can be reduced, leading to weight reduction. Further, the small pad and the pad body both made of the resin foam can be combined together to form the cushion material, leading to excellent moldability and recyclability. Note that the pressure receiving surface of the small pad as described above is a surface on a side provided with the pad body. Such a surface is a front surface in the case of providing the small pad at the seat back, and is an upper surface in the case of providing the small pad at the seat cushion.

A surface of the small pad is preferably provided with a plurality of recessed-raised portions. According to the above-described configuration, stiffness in the pitch direction relating to load input upon, e.g., start/stop of a vehicle and stiffness in the roll direction relating to load input upon horizontal oscillation can be enhanced, and therefore, the load input can be dispersed with a favorable balance. The stiffness can be further enhanced, and therefore, a thickness can be decreased for obtaining predetermined stiffness, leading to weight reduction.

Each protrusion forming the recessed-raised portions is preferably formed in a polygonal sectional shape. Each protrusion formed at the small pad is formed in the polygonal sectional shape as described above, and therefore, a body pressure applied to the small pad can be efficiently dispersed.

The side surface of the small pad is preferably provided with a plurality of recessed-raised portions. According to the above-described configuration, the recessed-raised portions formed at the side surface of the small pad can further enhance the stiffness in the pitch direction relating to the load input upon, e.g., start/stop of the vehicle and the stiffness in the roll direction relating to the load input upon horizontal oscillation. Thus, the load input can be dispersed with a favorable balance. The stiffness can be further enhanced, and therefore, the thickness can be decreased for obtaining the predetermined stiffness, leading to weight reduction.

The small pad is preferably formed with a higher density than that of the pad body. According to the above-described configuration, the small pad is formed with the higher density than that of the pad body, and therefore, vibration applied to the seat cushion material can be absorbed. Consequently, resonance with a human body can be reduced, and favorable seating comfortability is provided.

The small pad may be provided with a first ventilation hole, the first ventilation hole being formed to extend through the small pad. The pad body may be provided with a second ventilation hole, the second ventilation hole communicating with the first ventilation hole of the small pad. According to the above-described configuration, the small pad has the first ventilation hole, and the pad body covering the small pad has the second ventilation hole communicating with the first ventilation hole. This can enhance seat ventilation, and efficiently disperses the body pressure of a buttock lower portion. Consequently, comfortability can be improved.

The small pad may be provided with a dividing portion configured to divide the small pad in a seat right-to-left direction. According to the above-described configuration, the dividing portion for division in the seat right-to-left direction is formed at the small pad. Thus, when a seated person moves in the seat right-to-left direction, the small pad can deform to follow such movement. Even in a state in which the seated person moves to swing right to left, cushioning properties can be maintained. Further, the body pressure of the buttock lower portion can be efficiently dispersed by the dividing portion, and therefore, the comfortability can be improved.

Moreover, a vehicle seat preferably includes a seat cushion, a seat back, and the above-described vehicle seat cushion material provided at the seat cushion or the seat back. In the case of providing the vehicle seat cushion material at the seat cushion, the small pad is preferably disposed wider in a seat width direction than the ischial bone of the person seated on the vehicle seat. In the case of providing the vehicle seat cushion material at the seat back, the small pad is preferably disposed wider in the seat width direction than the waist of the person seated on the vehicle seat. According to the above-described configuration, in the case of providing the small pad at the seat cushion, the buttock lower portion of the seated person can be stably supported by the small pad disposed wider in the seat width direction than the ischial bone of the seated person. On the other hand, in the case of providing the small pad at the seat back, the waist of the seated person can be stably supported by the small pad disposed wider in the seat width direction than the waist of the seated person. In particular, since the small pad is disposed wider in the seat width direction than the ischial bone, a balance among seat cushion pressure dispersion, a bottom touching feeling, and vibration properties can be achieved.

The vehicle seat cushion material is preferably provided at the seat cushion, and the impregnation layer is preferably formed at the side surface of the small pad excluding a front portion of the seat cushion. According to the above-described configuration, the impregnation layer is formed at the side surface excluding the front portion of the seat cushion, and therefore, favorable seating comfortability is provided without enhancement of stiffness of the front portion of the seat cushion contacting a lower thigh portion of the person seated on the vehicle seat.

The vehicle seat cushion material may be provided at the seat back, and the impregnation layer may be formed at the side surface of the small pad excluding an upper portion of the seat back. According to the above-described configuration, the impregnation layer is formed at the side surface excluding the upper portion of the seat back, and therefore, favorable seating comfortability is provided without enhancement of stiffness of the upper portion of the seat back contacting an upper portion of the waist of the person seated on the vehicle seat.

According to the present disclosure, the three-dimensional structure is made such that the impregnation layer surrounds the small pad including the pressure receiving surface and the side surface, and the spring-like properties are exhibited. Since the small pad is surrounded by the impregnation layer with the three-dimensional structure, the small pad is less bendable by the input to the pressure receiving surface and the side surface in the perpendicular direction (the front-to-back direction, the right-to-left direction, etc.) as compared to the case of not forming the impregnation layer on the side surface, and settling due to long-term use is reduced. Even with thickness and weight reduction, favorable seating comfortability is provided. Moreover, according to the present disclosure, the body pressure applied to the small pad can be efficiently dispersed. Further, according to the present disclosure, the stiffness of the small pad can be more enhanced, and therefore, the load input can be dispersed with a favorable balance. The stiffness can be further enhanced, and therefore, the thickness can be decreased for obtaining the predetermined stiffness, leading to weight reduction. In addition, according to the present disclosure, resonance with the human body can be reduced, and favorable seating comfortability is provided. Moreover, according to the present disclosure, seat ventilation can be enhanced, and the body pressure of the buttock lower portion can be efficiently dispersed. Consequently, the comfortability can be improved. Further, according to the present disclosure, when the seated person moves in the seat right-to-left direction, the small pad can deform to follow such movement. Even in the state in which the seated person moves to swing right to left, the cushioning properties can be maintained. Further, the body pressure of the buttock lower portion can be efficiently dispersed, and therefore, the comfortability can be improved. In addition, according to the present disclosure, the buttock lower portion and the waist of the seated person can be stably supported. Moreover, according to the present disclosure, favorable seating comfortability is provided without enhancement of the stiffness of the front portion of the seat cushion contacting the lower thigh portion of the person seated on the vehicle seat. Further, according to the present disclosure, favorable seating comfortability is provided without enhancement of the stiffness of the upper portion of the seat back contacting the waist of the person seated on the vehicle seat.

BRIEF DESCRIPTION OF DRAWINGS

Various embodiments of the invention are illustrated in the drawings, in which.

DETAILED DESCRIPTION

The present disclosure relates to a vehicle seat cushion material and a vehicle seat that includes the vehicle seat cushion material, and particularly relates to a vehicle seat cushion material having an impregnation layer with a three-dimensional structure and to a vehicle seat. Embodiments described below are set forth merely as examples for the sake of easy understanding of the present disclosure, and are not intended to limit the present disclosure. That is, changes and modifications can be made to the shapes, dimensions, arrangements, etc. of members described below without departing from the gist of the present disclosure, and needless to say, the present disclosure includes equivalents thereof.

First Embodiment

Figure 1:
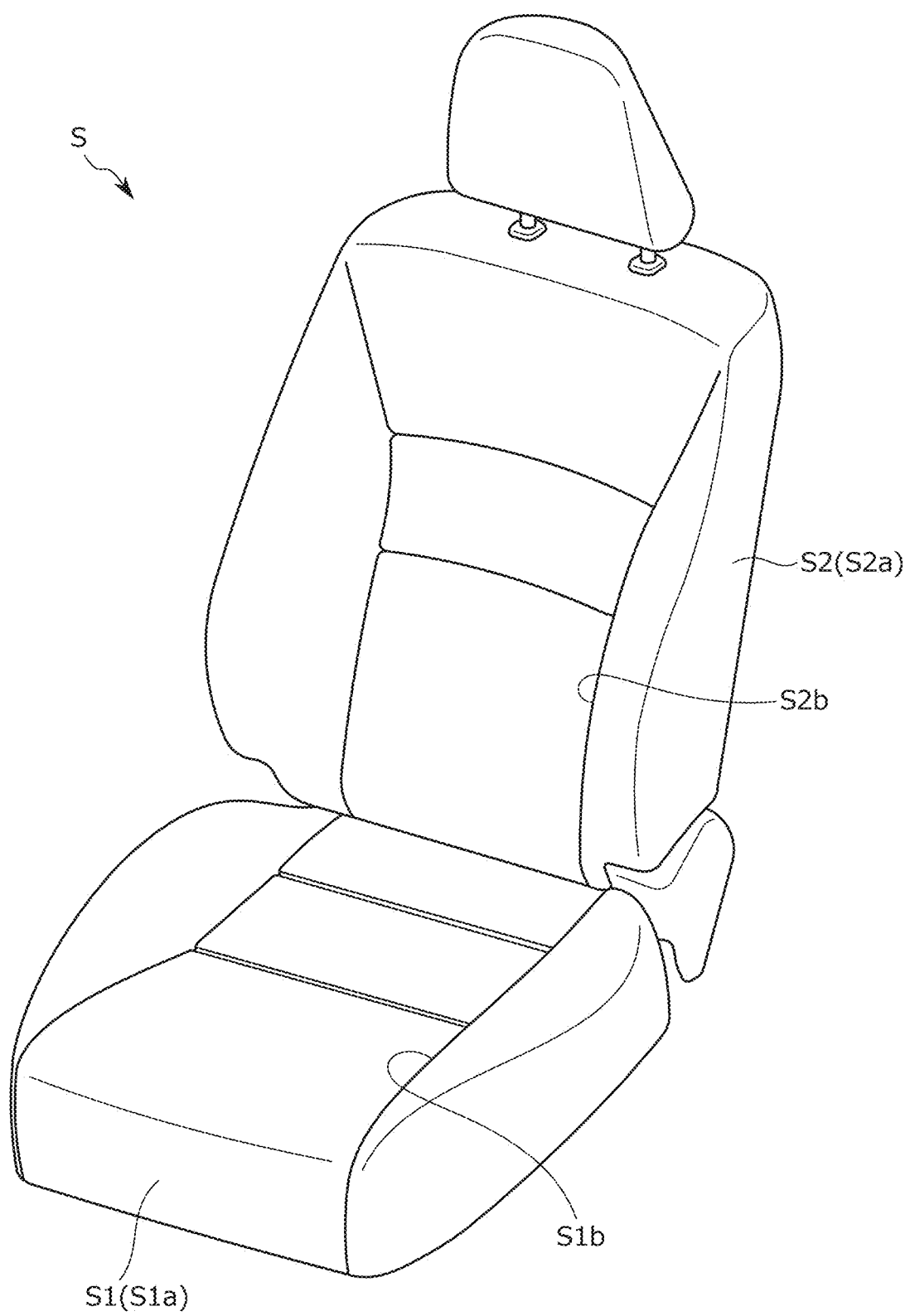
FIG. 1 is a perspective view of a vehicle seat of a first embodiment of the present disclosure.
Figure 2:
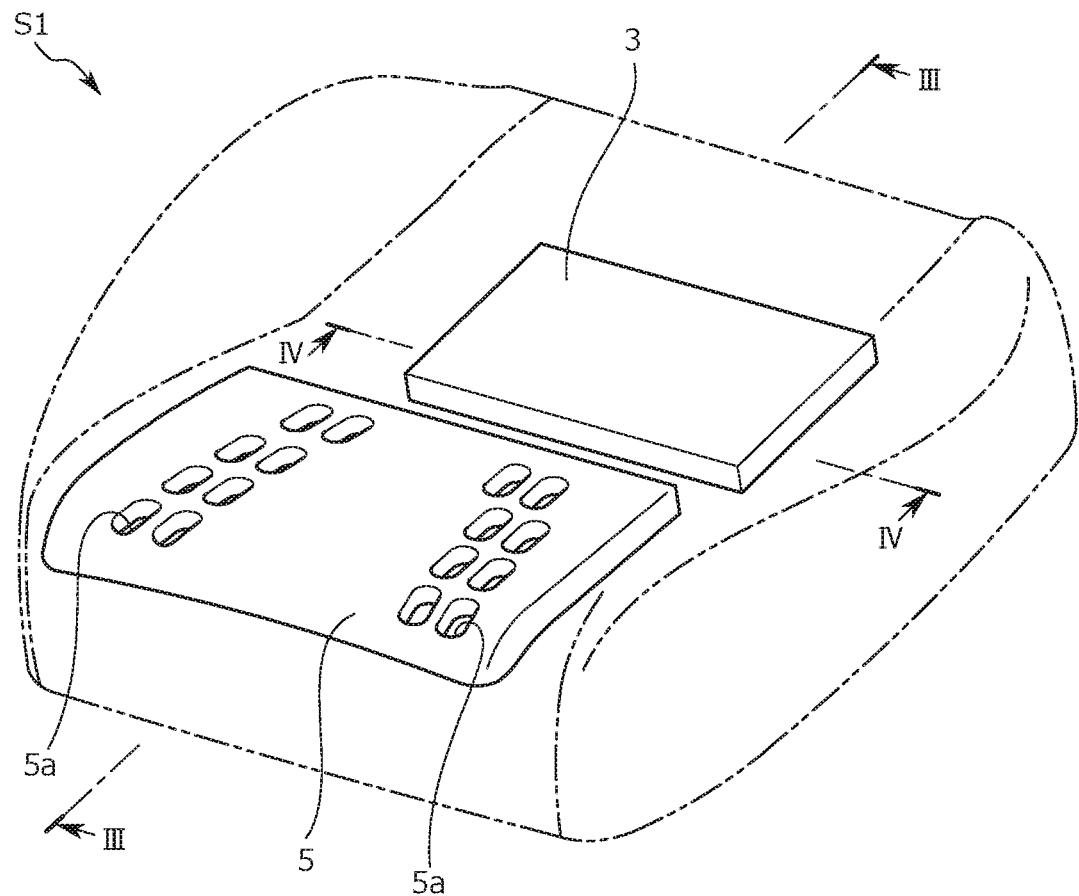
FIG. 2 is a perspective view for describing a small pad and a front pad with the small pad and the front pad being seen through a skin material of the vehicle seat of FIG. 1.
Figure 3:
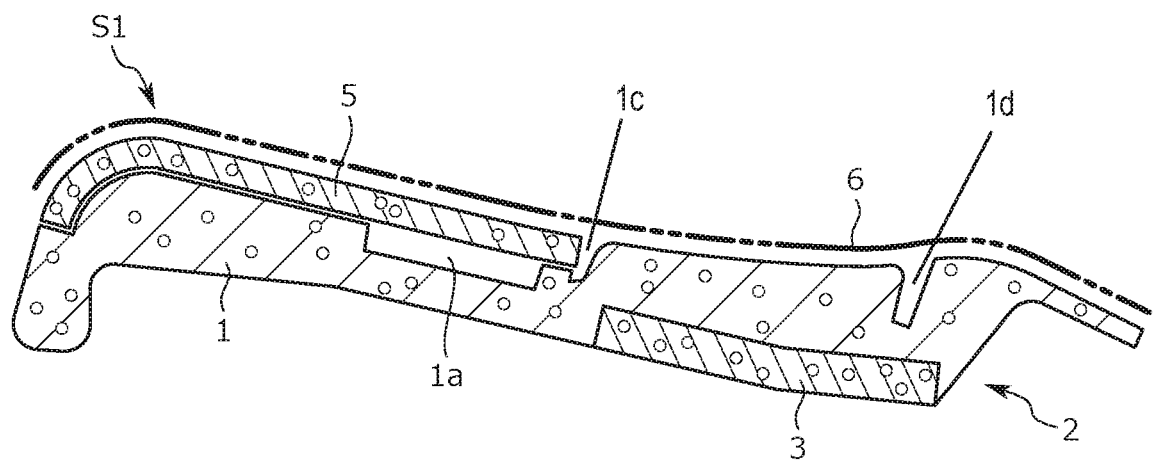
FIG. 3 is a schematic cross-sectional view of a seat cushion along an line of FIG. 2.
Figure 4:
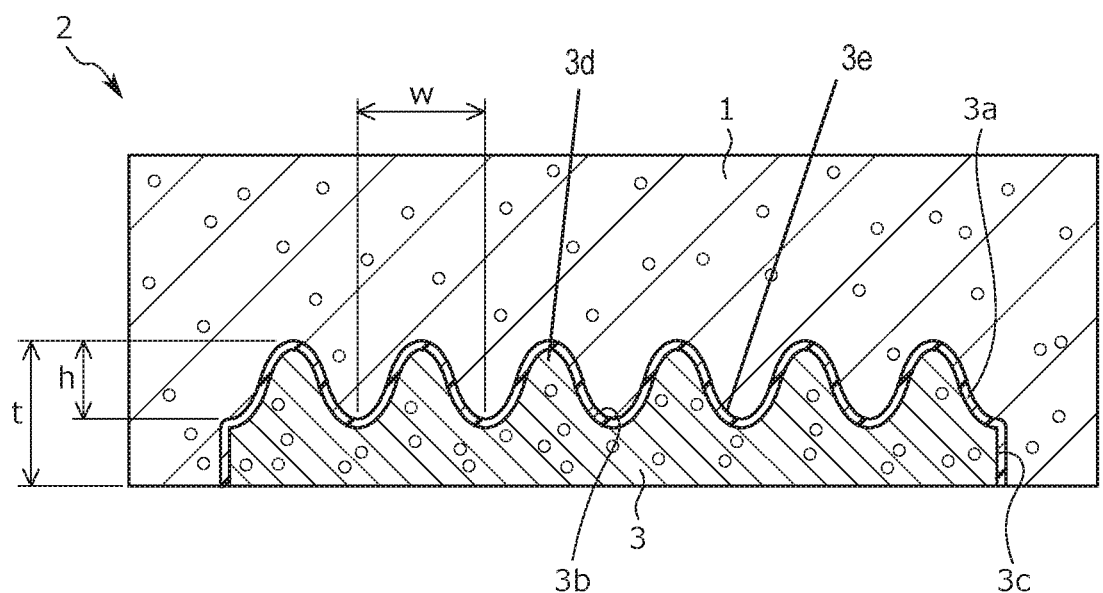
FIG. 4 is a schematic cross-sectional view of a cushion material along an IV-IV line of FIG. 2.
Figure 5:
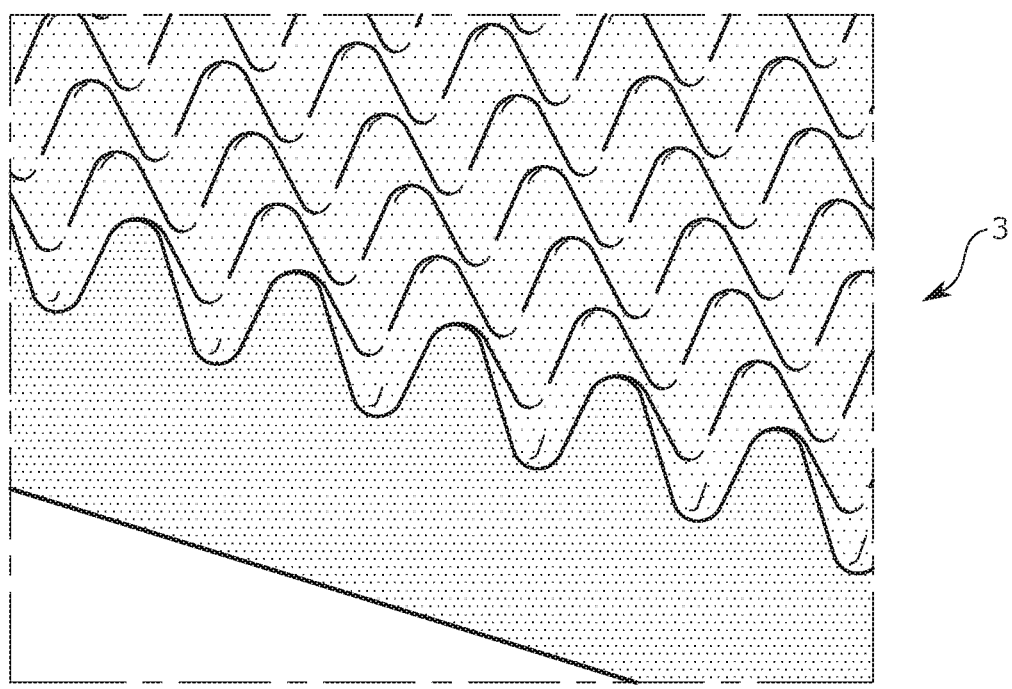
FIG. 5 is a perspective view of the small pad.

A first embodiment of the present disclosure is described below with reference to the drawings. First, configurations of a vehicle seat S and a cushion material 2 according to the present embodiment are described with reference to FIGS. 1 to 5. Note that FIG. 1 is a perspective view of the vehicle seat S of the embodiment of the present disclosure, and FIG. 2 is a perspective view for describing a small pad 3 of the vehicle seat S and a front pad 5 of the vehicle seat S with the small pad 3 and the front pad 5 being seen through a skin material S1a of the vehicle seat S. Moreover, FIG. 3 is a schematic cross-sectional view of a seat cushion S1 along a line of FIG. 2, FIG. 4 is a schematic cross-sectional view of the cushion material 2 along an IV-IV line of FIG. 2, and FIG. 5 is a perspective view of the small pad 3. The small pad 3 is illustrated without a corrugated surface shape for simplicity in FIG. 2 and FIG. 3.

As illustrated in FIG. 1, the vehicle seat S includes the seat cushion S1 on which a person can be seated, and a seat back S2 as a backrest. A surface of the vehicle seat S is covered with the skin materials S1a, S2a. As illustrated in FIG. 2, the seat cushion S1 includes the cushion material 2 and the skin material S1a covering the cushion material 2. As illustrated in FIG. 1, the seat cushion S1 has a pair of pull-in grooves S1b in which the skin material S1a is pulled, the pull-in grooves S1b being separated from each other in a seat width direction (also referred to as a "seat right-to-left direction") and being formed to extend in a front-to-back direction. Similarly, the seat back S2 has a pair of pull-in grooves S2b in which the skin material S2a is pulled, the pull-in grooves S2b being separated from each other in the seat width direction and being formed to extend in the upper-to-lower direction. As illustrated in FIG. 3, the cushion material 2 includes the small pad 3 as a lower layer, a pad body 1 formed as an upper layer to cover the small pad 3 and stacked integrally with the small pad 3, and the front pad 5 provided at an upper front portion of the pad body 1. Note that the cushion material 2 is configured such that a certain portion of the small pad 3 has a double-layer structure of the small pad 3 and the pad body 1.

The small pad 3 is made of a resin foam material such as urethane foam, polyethylene, or polypropylene. An upper surface 3b which is a seated-person-side surface of the small pad 3 (e.g., a pressure receiving surface) is uniformly formed in such a corrugated shape that a plurality of ridges are continuously formed. In other words, the upper surface 3b is formed as in one side portion of a holding container for holding a plurality of eggs (e.g., an egg carton). When disposed at the seat cushion S1, the small pad 3 is, for supporting the buttocks of the seated person, disposed at a position which is to contact lower portions of the buttocks of the seated person on the back side of the seat cushion S1. In particular, the small pad 3 is formed to have a greater width in the seat width direction than that of the ischial bone of the seated person, and is formed to reach the vicinity of the pair of pull-in grooves S1b.

When disposed at the seat back S2, the small pad 3 is, for supporting the waist of the seated person, disposed at a position which is to contact a back portion of the waist of the seated person. In particular, the small pad 3 is formed to have a greater width in the seat width direction than that of the waist of the seated person, and is formed to reach the vicinity of the pair of pull-in grooves S2b provided at the seat back S2. Note that the pressure receiving surface of the small pad 3 is disposed with a substantially uniform distance from a surface of the seat cushion S1 or the seat cushion S2 at which the small pad 3 is disposed. With this arrangement of the small pad 3, a body pressure from the seated person can be more efficiently dispersed. The pressure receiving surface of the small pad 3 as described herein is the upper surface 3b in the case of the small pad 3 being disposed at the seat cushion S1, and is a front surface in the case of the small pad 3 being disposed at the seat back S2. Moreover, the corrugated shape of the small pad 3 can be molded in a three-dimensional shape by means of a molded article. Thus, there is a degree of freedom in designing, and a cost can be more reduced as compared to urethane slab subjected to profile processing.

The pad body 1 is made of molded urethane, and is formed to extend in the front-to-back direction of the seat cushion S1 to form the profile of the seat cushion S1. Moreover, the density of the pad body 1 is set smaller than that of the small pad 3, and the thickness of the pad body 1 is set greater than that of the small pad 3. With such a configuration, vibration applied to the pad body 1 can be absorbed, resonance with a human body can be reduced, and favorable seating comfortability is provided.

At a portion of the upper surface 3*b* and side surfaces 3*c* of the small pad 3 contacting the pad body 1, an impregnation layer 3*a* is thinly formed to cover such a portion as illustrated in FIG. 4. The impregnation layer 3*a* is formed to cover the upper surface 3*b* and the side surfaces 3*c* of the small pad 3. With such a sterically-formed impregnation layer 3*a*, stiffness against a load in an upper-to-lower direction can be enhanced. Thus, the small pad 3 becomes less bendable, and settling due to long-term use can be reduced. Even with thickness reduction and weight reduction, favorable seating comfortability is provided.

The front pad 5 is made of a resin foam material such as urethane foam, polyethylene, or polypropylene. The front pad 5 has a plurality of through-holes 5*a*, the through-holes 5*a* penetrating the front pad 5 in the upper-to-lower direction and being more separated from each other toward the front side in a gradual manner. As illustrated in FIG. 3, a space to be an air sending path 1*a* for air conditioning is formed between the pad body 1 and the front pad 5. As described above, the air sending path 1*a* for air conditioning or a heater 6 can be provided in the space expanded by reduction in the thickness of the cushion material 2. With this configuration, e.g., a device configured to produce comfortable environment can be mounted in a limited space.

Note that it has been described that the air sending path 1*a* is formed between the pad body 1 and the front pad 5, but similarly, may be provided at a portion between the pad body 1 and the small pad 3 or a portion of a lower surface of the small pad 3. The air sending path 1*a* is provided at the periphery of the small pad 3 as described above so that the body pressure applied from the buttocks can be dispersed for improvement of a ride quality and that ventilation below the buttocks can be enhanced for improvement of comfortability.

Performance of Cushion Material

Typically, when the thickness of the cushion material 2 is decreased, the amount of bending in response to the applied load increases, and therefore, a bottom touching feeling might be provided to the seated person. Further, when a single-layer structure is changed to a multilayer structure, a resonance frequency and a resonance magnification change due to natural frequency fluctuation. For this reason, uncomfortable vibration might be caused due to resonance with vehicle vibration.

Figure 6:
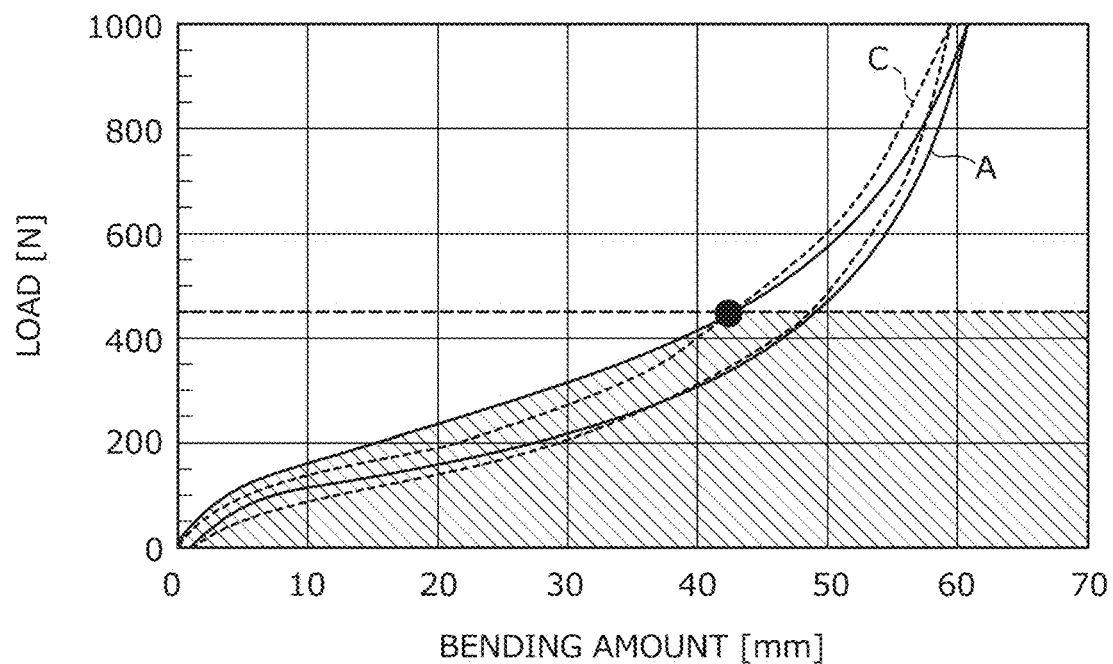
FIG. 6 is a graph showing a relationship of a bending amount to a load between a cushion material with a single-layer structure and the cushion material with a double-layer structure according to the present embodiment.
Figure 7:
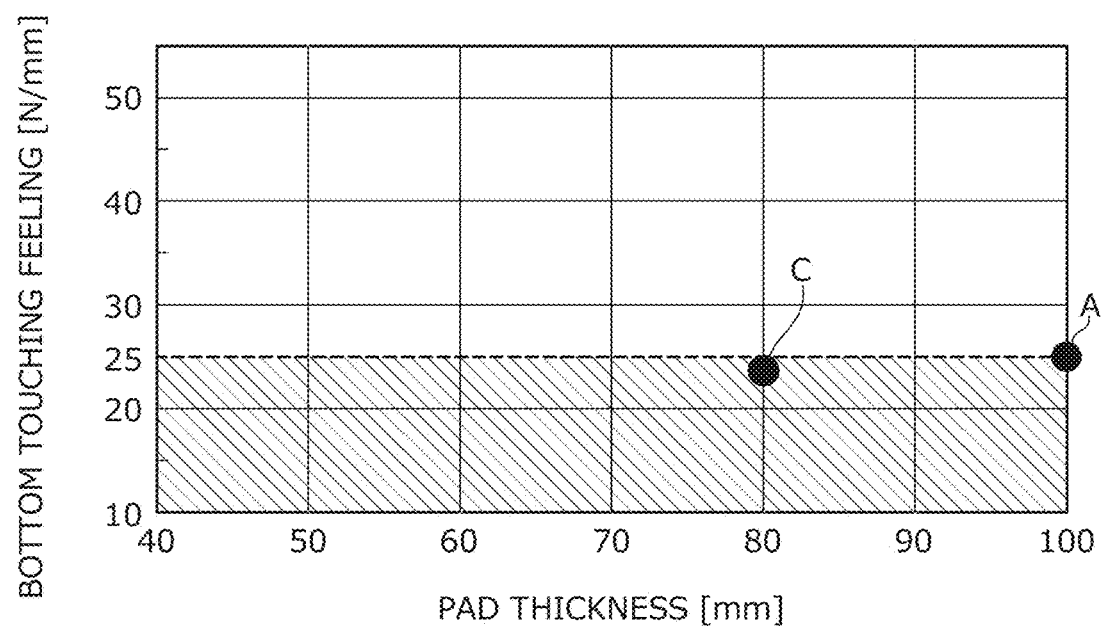
FIG. 7 is a graph showing a relationship of a PAD thickness to a bottom touching feeling between the cushion material with the single-layer structure and the cushion material with the double-layer structure according to the present embodiment when 600 N is applied to the cushion material.

Thus, performance of the cushion material 2 having a thickness of 80 mm according to the above-described configuration is described with reference to FIGS. 6 to 8 as compared to performance of a cushion material having a thickness of 100 mm according to a typical single-layer structure. Note that FIG. 6 is a graph showing a relationship of a bending amount to a load between the cushion material with the single-layer structure and the cushion material 2 with the double-layer structure according to the present embodiment. Moreover, FIG. 7 is a graph showing a relationship of a pad thickness to a bottom touching feeling between the cushion material with the single-layer structure and the cushion material 2 with the double-layer structure according to the present embodiment when 600 Newtons is provided to the cushion material. Further, FIG. 8 is a graph showing vibration transmission properties as a relationship of a frequency to a response magnification between the cushion material with the single-layer structure and the cushion material 2 with the double-layer structure according to the present embodiment.

Figure 8:
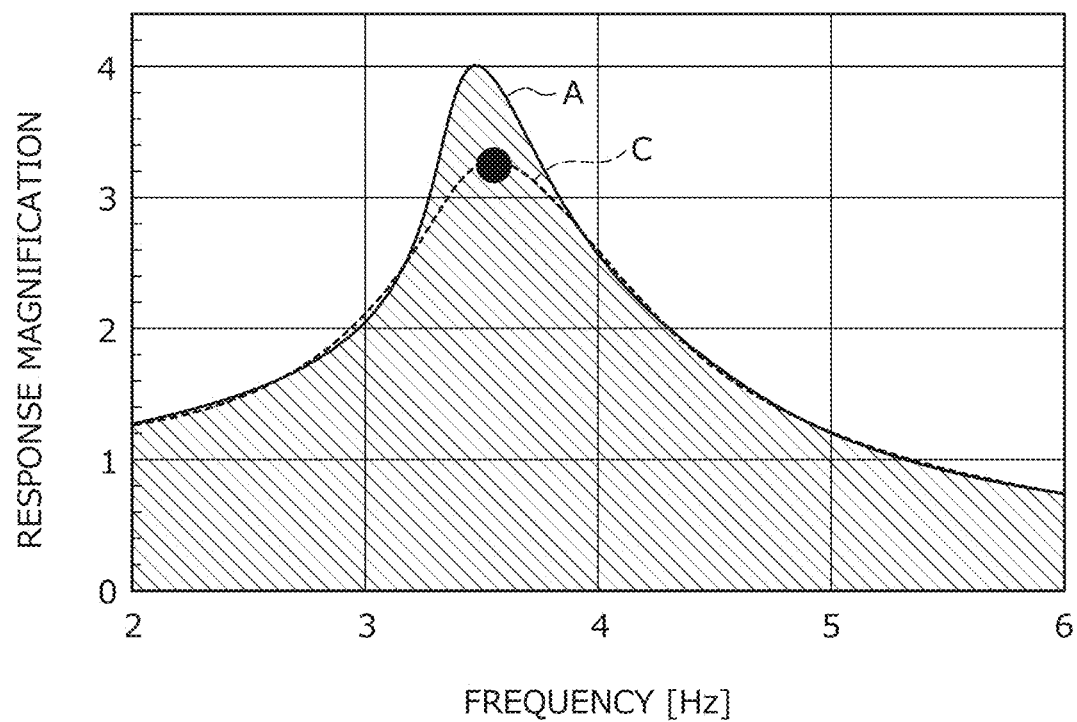
FIG. 8 is a graph showing vibration transmission properties as a relationship of a frequency to a response magnification between the cushion material with the single-layer structure and the cushion material with the double-layer structure according to the present embodiment.

In FIGS. 6 to 8, data A is data corresponding to the cushion material with the single-layer structure, and data C is data corresponding to the cushion material 2 with the double-layer structure. A shaded portion in each of FIGS. 6 to 8 indicates a range recognized as having equal or higher performance of the cushion material 2 than that of the cushion material with the single-layer structure.

As shown in FIG. 6, the data C shows, despite the decreased thickness of the cushion material 2, the substantially same bending amount as that of the data A. That is, the cushion material 2 can maintain cushioning properties despite the decreased thickness.

Moreover, as shown in FIG. 7, the data C shows a lower bottom touching feeling than that of the data A. The bottom touching feeling described herein is a static spring constant when the load shown in FIG. 6 is 600 Newtons. A smaller static spring constant value results in smaller fluctuation in reactive force from the cushion material, leading to favorable seating comfortability.

Further, as shown in FIG. 8, the data C shows the substantially same resonance frequency as that of the data A in a resonance state with the peak response magnification, and shows a lower resonance magnification than that of the data A. In particular, a frequency providing an uncomfortable feeling to the seated person is 6 Hz, which is close to the natural frequency of the abdomen. According to the cushion material 2, a lower frequency than 6 Hz is the resonance frequency, and therefore, the uncomfortable feeling provided to the seated person can be avoided. Note that the thickness and formation position of the impregnation layer 3*a* is changed so that the natural frequency of the cushion material 2 can be adjusted.

In body pressure distribution, a locally-high pressure is notably shown when the thickness of the cushion material 2 is decreased. However, for the cushion material 2 with the double-structure and the thickness of 80 mm, the density of the pad body 1 as the upper layer is decreased as compared to that of the single-layer structure so that uniform body pressure distribution equivalent to that of the cushion material with the single-layer structure and the thickness of 100 mm can be maintained.

As described above, according to the vehicle seat S and the cushion material 2 of the above-described embodiment, the thickness of the cushion material 2 can be decreased. Vibration received by a vehicle can be absorbed, resonance with the human body can be reduced, and favorable seating comfortability is provided.

Variation

Figure 9:
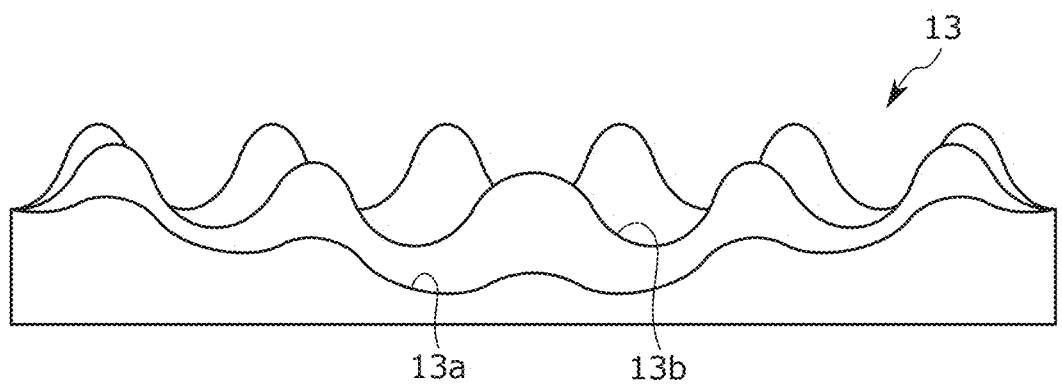
FIG. 9 is a schematic side view of a small pad of a variation.

In the above-described embodiment, the small pad 3 having the uniformly-corrugated surface shape has been described, but the present disclosure is not limited to such a form. For example, as illustrated in FIG. 9, a small pad 13 formed in a non-uniform surface shape having corrugated portions 13*a*, 13*b* with different heights h may be employed. In particular, the small pad 13 of the present variation is disposed at the seat cushion S1 such that the corrugated portion 13*a* with a smaller height h is positioned on the front side of the seat cushion S1, repeated stress tending to be applied from the thighs of the seated person to the front side of the seat cushion S1. The corrugated portions 13*a*, 13*b* are in such a gradually-changing shape that the height gradually decreases toward the front side.

With such arrangement of the small pad 13, stiffness of the small pad 13 on the seat front side can be decreased, and therefore, reactive force received by the thighs of the seated person from the small pad 13 can be reduced. Consequently, favorable seating can be comfortability provided. In the case of providing the small pad 13 at the seat back S2, the small pad 13 may be disposed at the seat back S2 such that the corrugated portion 13a with the smaller height h is positioned on the upper side of the seat back S2. With this configuration, an increase in stiffness of the seat back S2 contacting an upper portion of the waist of the seated person is suppressed, the corrugated portion 13a being positioned at the upper portion. Consequently, favorable seating comfortability is provided.

For the same reason, the impregnation layer 3a is, as described below, not necessarily formed at a portion of a side surface of the small pad 13 on a reactive force reduction side, such as a front portion of the seat cushion S1 at which the thighs of the seated person are positioned or an upper portion of the seat back S2 at which the upper portion of the waist of the seated person is positioned. In other words, the impregnation layer 3a is formed at other portions of the small pad 13 than the above-described portions so that stiffness can be enhanced with favorable seating comfortability.

Second Embodiment

Figure 10:
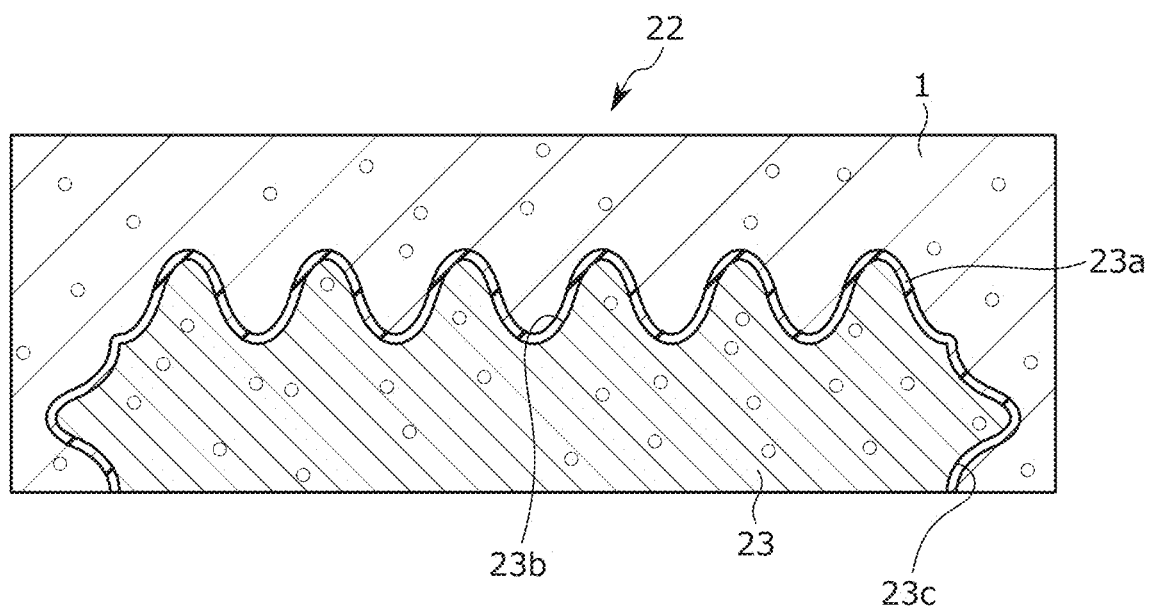
FIG. 10 is a schematic cross-sectional view of a cushion material of a second embodiment along the IV-IV line of FIG. 2.

In the above-described embodiment, it has been described that only the seated-person-side surface of the small pad 3 is formed in the corrugated shape, but the present disclosure is not limited to such a configuration. A small pad 23 of a second embodiment is described next with reference to FIG. 10. Note that FIG. 10 is a schematic cross-sectional view of a cushion material 22 of the second embodiment along the IV-IV line of FIG. 2.

The cushion material 22 includes the small pad 23, an impregnation layer 23a, and a pad body 1. Among these elements, the small pad 23 is, unlike the small pad 3 of the first embodiment, particularly formed in a corrugated shape not only at an upper surface 23b as a pressure receiving surface but also at side surfaces 23c. Thus, the impregnation layer 23a covering an outer surface of the small pad 23 is, unlike the impregnation layer 3a of the first embodiment, also formed in a corrugated shape at side surfaces thereof.

According to the cushion material 22 having the small pad 23 formed as described above, the small pad 23 and the impregnation layer 23a protrude in a substantially horizontal direction, and therefore, stiffness against movement in a roll/pitch direction of the cushion material 22 can be enhanced. In other words, stiffness against swing about an axis in the direction of expanding on a substantially horizontal plane of the small pad 23 can be enhanced. In particular, the high-stiffness cushion material 22 is preferably used for a retractable seat as a back seat of a vehicle exhibiting low support stiffness and easily causing front-to-back and right-to-left vibration because favorable seating comfortability is provided.

Note that the present disclosure is not limited only to the form in which the side surfaces 23c of the small pad 23 are in the corrugated shape. For example, the side surfaces 23c may be formed in a tapered shape such that stiffness is adjusted by a change in the volumes of the small pad 23 and the impregnation layer 23a.

Third Embodiment

Figure 11:
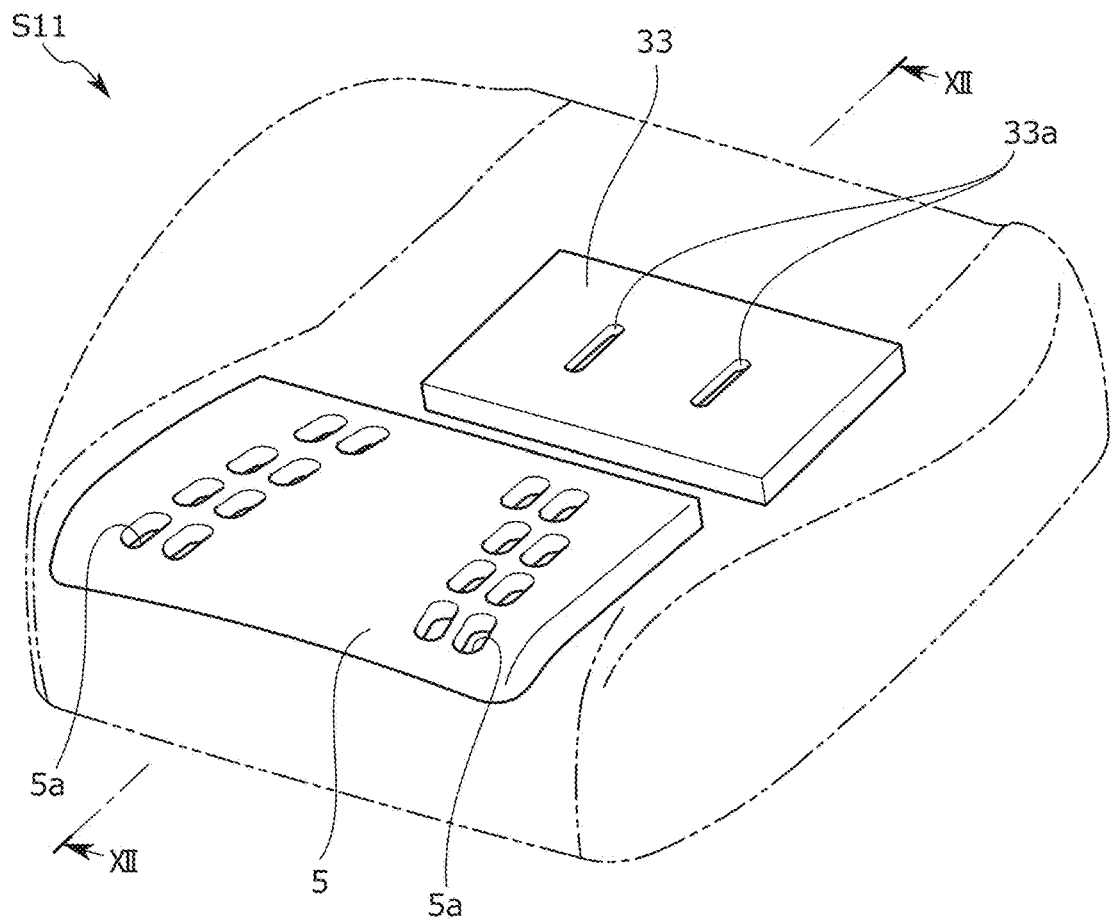
FIG. 11 is a perspective view for describing a small pad of a seat cushion of a third embodiment.

Next, a seat cushion S11 allowing favorable ventilation according to a third embodiment is described with reference to FIGS. 11 and 12. Note that FIG. 11 is a perspective view for describing a small pad 33 of the seat cushion 511 of the third embodiment, and FIG. 12 is a schematic cross-sectional view of the seat cushion 511 along a XII-XII line of FIG. 11.

The seat cushion S11 of the third embodiment includes a pad body 31 and the small pad 33. As illustrated in FIGS. 11 and 12, the small pad 33 has a pair of first ventilation holes 33a, the first ventilation holes 33a being arranged in the seat width direction. Each first ventilation hole 33a is formed such that a long-axis direction thereof extends along the seat front-to-back direction as viewed in the plane, and is formed to extend through the small pad 33 in a thickness direction thereof.

Figure 12:
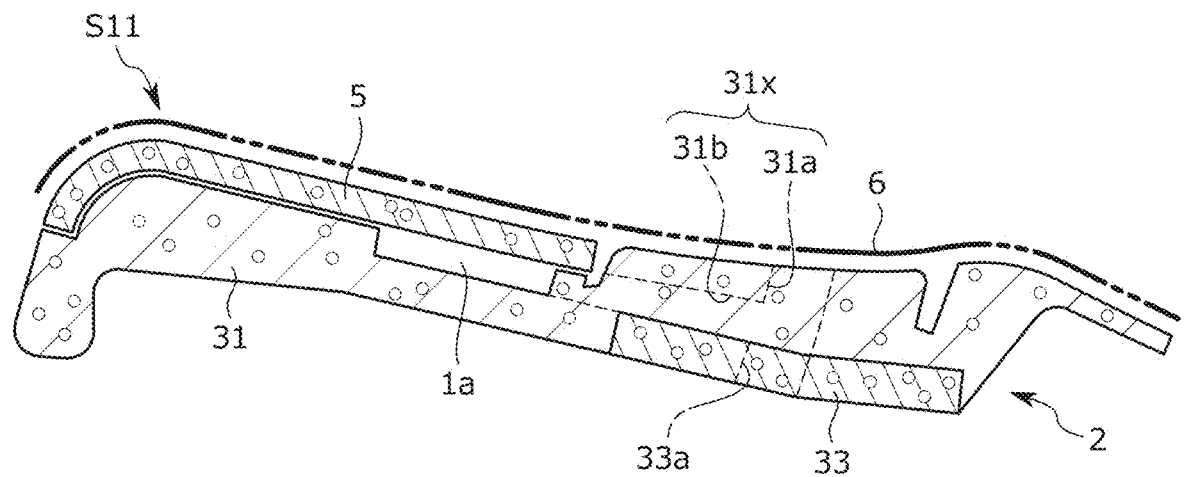
FIG. 12 a schematic cross-sectional view of the seat cushion along a XII-XII line of FIG. 11.

As illustrated in FIG. 12, the pad body 31 has a second ventilation hole 31x, the second ventilation hole 31x including a longitudinal hole portion 31a and a transverse hole portion 31b extending substantially perpendicular to the longitudinal hole portion 31a. The longitudinal hole portion 31a is communicatively formed on an extension of each first ventilation hole 33a of the small pad 33, and is formed to extend through the pad body 31 in a thickness direction thereof as the upper-to-lower direction. The transverse hole portion 31b is formed continuously from a lower portion of the longitudinal hole portion 31a, and as viewed in the plane, is formed to expand diagonally forward with respect to the seat front-to-back direction toward a plurality of through-holes 5a, the through-holes 5a being more separated from each other toward the front side in a gradual manner. Moreover, the transverse hole portion 31b is, after extending forward, connected to an air sending path 1a.

Since the longitudinal hole portion 31a is formed at the pad body 31 as described above, the body pressure of a seated person can be dispersed in a radial pattern about the longitudinal hole portion 31a. Thus, favorable seating comfortability is provided. With the first ventilation holes 33a formed at the small pad 33 and the second ventilation hole 31x formed at the pad body 31, favorable ventilation of the seat cushion S11 is provided.

In particular, the first ventilation holes 33a and the longitudinal hole portion 31a are preferably arranged within a maximum load region of the buttocks of the seated person. With this configuration, when the seated person moves up and down during traveling of a vehicle, the volume of the longitudinal hole portion 31a is decreased/restored such that air in the longitudinal hole portion 31a is suitably ventilated in a thickness direction of a cushion material 2 through the first ventilation holes 33a.

At the pad body 31, the transverse hole portion 31b is formed continuously to the longitudinal hole portion 31a, and is further connected to the air sending path 1a. Thus, upon traveling of the vehicle as described above, the air flows, through the transverse hole portion 31b, back and forth between the longitudinal hole portion 31a and the air sending path 1a. In this state, the air also flows from the air sending path 1a to the through-holes 5a. Thus, the air upwardly flows toward the thighs of the seated person positioned above the through-holes 5a, and therefore, comfortability of the seated person is improved. Note that a blower (not shown), for example, provided at a vehicle seat S allows, in other situations than the situation upon traveling of the vehicle, enhancement of ventilation by a forced air supply to the air sending path 1a, the second ventilation hole 31x, the first ventilation holes 33a, etc.

Fourth Embodiment

Figure 13:
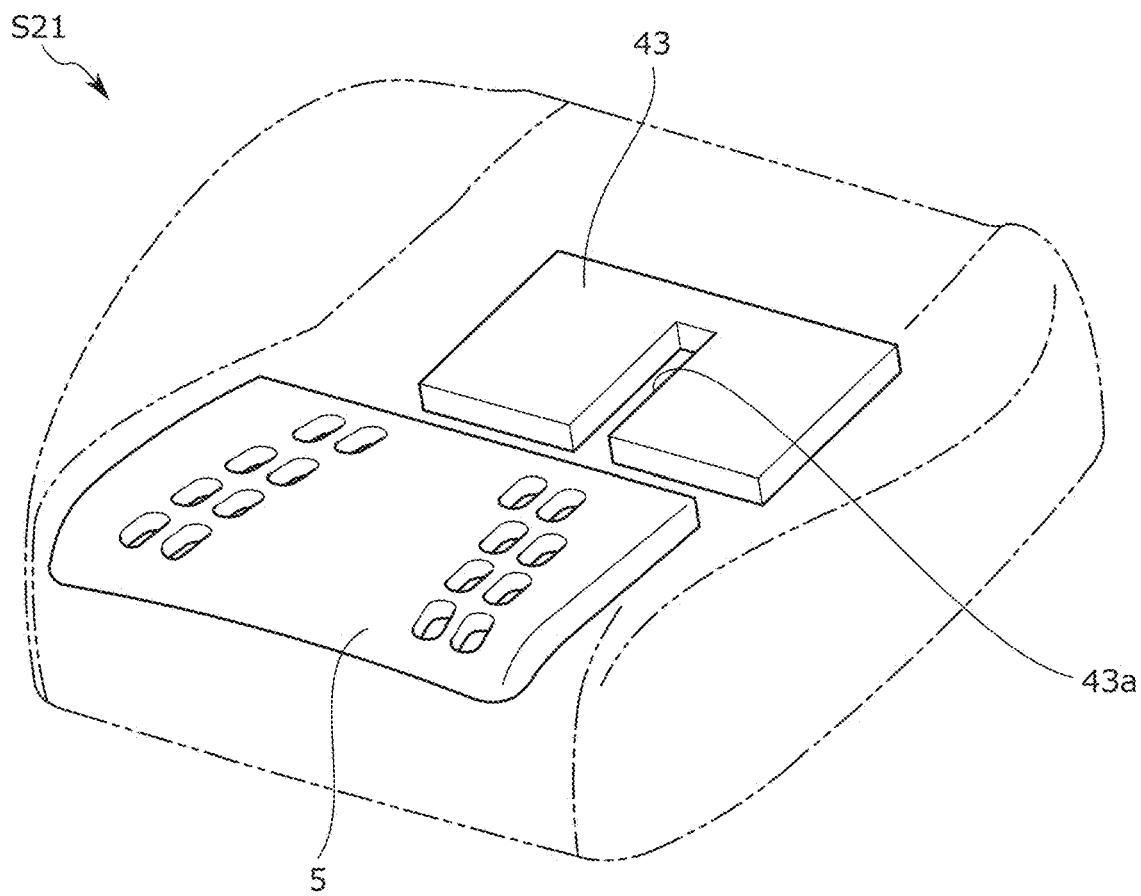
FIG. 13 is a perspective view for describing a small pad of a seat cushion of a fourth embodiment.

Next, a seat cushion S21 of a fourth embodiment that maintains cushioning properties even upon movement of a seated person in the seat right-to-left direction is described with reference to FIG. 13. Note that FIG. 13 is a perspective view for describing a small pad 43 of the seat cushion S21 of the fourth embodiment.

The seat cushion S21 of the fourth embodiment includes the small pad 43. As illustrated in FIG. 13, the small pad 43 has a slit 43a, the slit 43a being cut backward from a front surface of the small pad 43 in a thickness direction thereof at the center of the small pad 43 in the seat width direction. That is, the small pad 43 is, on the front side thereof, divided in the seat width direction by the slit 43a as a dividing portion, and therefore, is slightly movable in the seat width direction. On the other hand, the slit 43a is not formed to reach a back surface of the small pad 43, and therefore, movement in the seat width direction is restricted on the back side of the small pad 43. Thus, the entire shape of the small pad 43 is held.

The slit 43a is formed at the small pad 43 as described above. Thus, even in a case where the posture of the seated person tilts in the seat width direction when a vehicle travels around a curve or the person gets in and out of the vehicle, the front side of the small pad 43 follows such tilting. Thus, even when a body pressure is unevenly applied to the seat cushion S21, the body pressure of the seated person can be suitably dispersed, and therefore, the cushioning properties is maintained with enhanced comfortability.

Note that in the present embodiment, the small pad 43 having the slit 43a cut backward from the front surface in the thickness direction has been described as an example, but the present disclosure is not limited to such a configuration. For example, the small pad may include two or more small pads fully separated from each other in the seat width direction.

In the above-described embodiments, it has been described that in the case of providing the cushion material 2, 22 at the seat cushion S1 or the seat back S2, the cushion material 2, 22 is disposed such that the corrugated surface is positioned on the seated person side (the pressure receiving surface side). However, the present disclosure is not limited to such a configuration.

For example, the cushion material 2, 22 may be disposed such that the corrugated surface is positioned on the opposite side of the seated person side, i.e., the back side. With this configuration, the load received from the seated person can be dispersed on the back side, providing favorable seating comfortability. Note that both of the front side as the seated person side and the back side may be formed in the corrugated shape. This can reduce the weight of the cushion material 2, 22. In particular, a configuration of the cushion material 2, 22 having the corrugated shape on the back side is suitable in the case of application to the seat cushion S1 placed on a high-stiffness floor frame.

Moreover, in the above-described embodiments, the corrugated shape of the small pad 3, 23 is a cornerless shape easily dispersing stress, and leads to fewer molding defects, such as underfill, and high mass productivity. Thus, such a shape is preferable. However, stiffness of the cushion material 2, 22 can be enhanced, but the present disclosure is not limited to such a shape as long as the shape has a raised-recessed portion without any molding problem such as underfill.

Other Variations

An example of a small pad 53 having various protrusions 53b, 63a, 63b, 63c, 63d is described with reference to FIGS. 14, 15A, 15B, 15C, and 15D. Note that FIG. 14 is a cross-sectional view of a cushion material 52 of another variation, and FIGS. 15A to 15D are views for describing the sectional shapes of the protrusions 63a, 63b, 63c, 63d of the small pad 53 of other variations.

Figure 14:
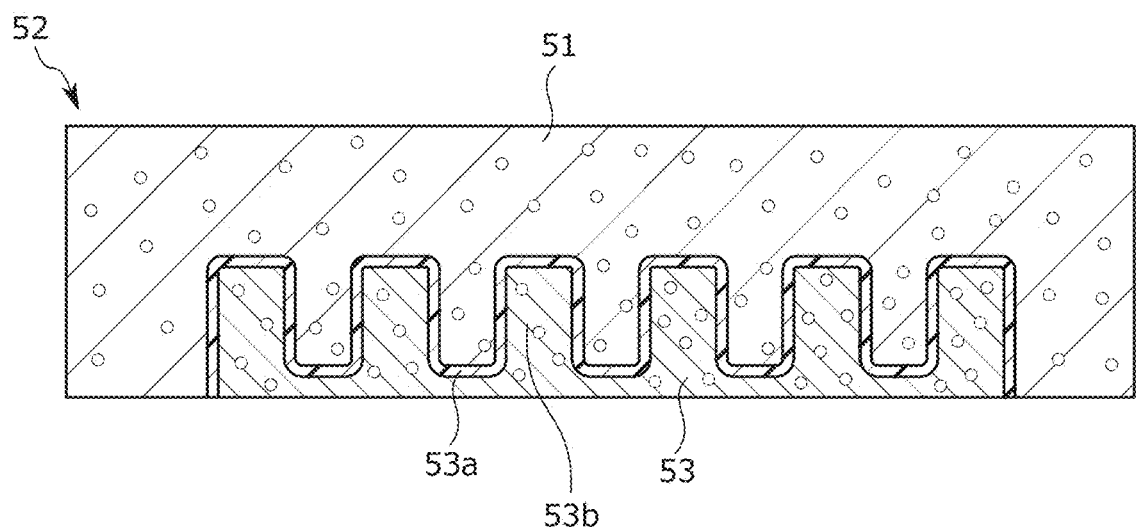
FIG. 14 is a cross-sectional view of a cushion material of another variation.
Figure 15A:
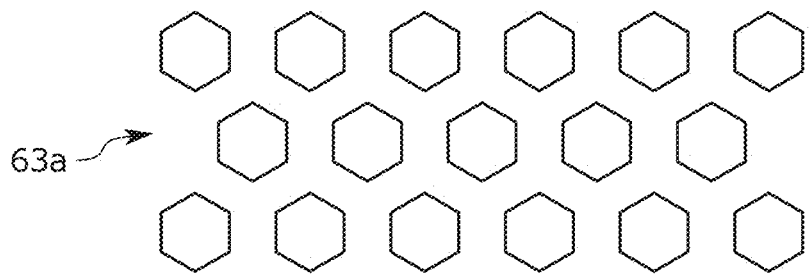
FIG. 15A is a view for describing the sectional shape of a protrusion of a small pad of still another variation.
Figure 15B:
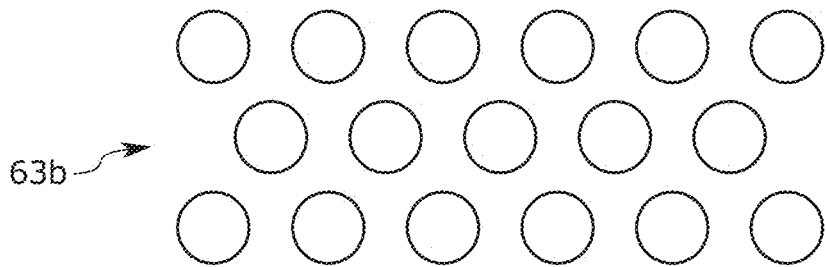
FIG. 15B is a view for describing the sectional shape of a protrusion of a small pad of still another variation.
Figure 15C:
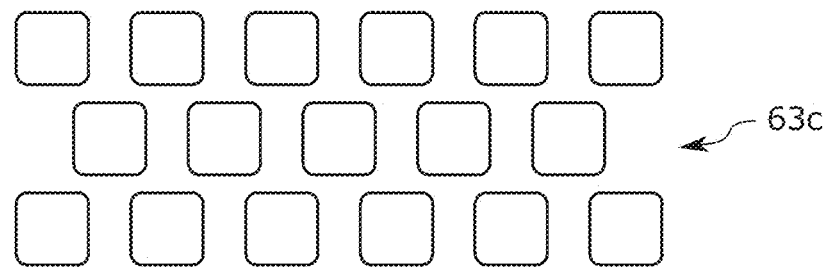
FIG. 15C is a view for describing the sectional shape of a protrusion of a small pad of still another variation.
Figure 15D:
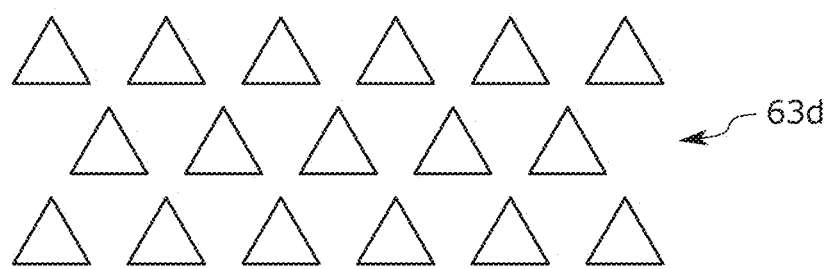
FIG. 15D is a view for describing the sectional shape of a protrusion of a small pad of still another variation.

As illustrated in FIG. 14, the cushion material 52 of the another variation includes the small pad 53, a pad body 51 covering the small pad 53 from above, and an impregnation layer 53a formed between the small pad 53 and the pad body 51. In particular, the small pad 53 has, unlike the above-described embodiment with the continuously-formed corrugated upper surface 3b, the plurality of upward protrusions 53b. The sectional shape of the protrusion 53b is particularly preferably a hexagonal sectional shape as illustrated in FIG. 15A because the body pressure applied from the seated person can be suitably dispersed to each side of the hexagonal shape. The sectional shape of the protrusion 53b is not limited to such a shape, and may be a circular sectional shape illustrated in FIG. 15B, an oval shape (not shown), or a polygonal sectional shape such as a rectangular sectional shape illustrated in FIG. 15C or a triangular sectional shape illustrated in FIG. 15D. The hexagonal sectional shape, the rectangular sectional shape, and the triangular sectional shape as described herein are, including other sectional shapes with a plurality of corners, referred to as "polygonal sectional shapes." Each protrusion 53b is preferably formed with the circular sectional shape, the oval sectional shape, or the polygonal sectional shape as described above because the body pressure applied from the seated person is easily dispersed.

Note that as described above, the protrusions 53b, 63a, 63b, 63c, 63d are not limited to those formed on the front side (in other words, the pressure receiving surface side) of the small pad 53, and may be formed on the lateral side. In the case of forming the protrusions 53b, 63a, 63b, 63c, 63d not only on the front side but also on the lateral side, a contact area between the small pad 53 and the pad body 51 is increased, and therefore, bonding strength is also increased.

Molding Method

Figure 16:
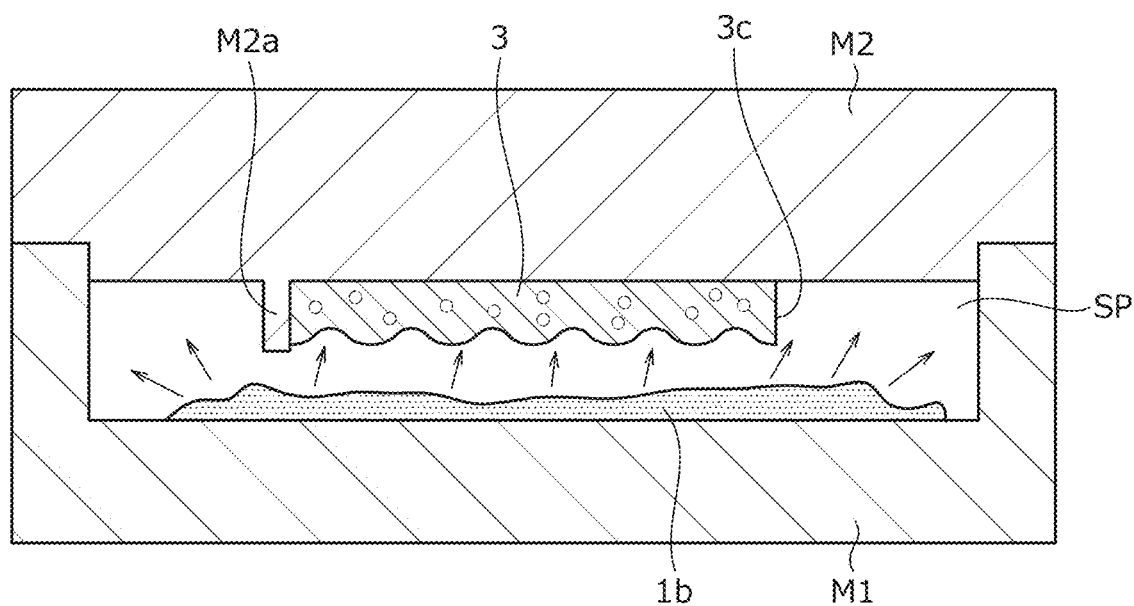
FIG. 16 is a schematic cross-sectional view for describing a state in which the cushion material is being molded.

An example of the method for molding the cushion material 2 is a method in which the pad body 1 is insert-molded with the small pad 3 being placed in a mold. In particular, a lower mold M1 and an upper mold M2 illustrated in FIG. 16 are used in the method for forming the impregnation layer 3a at the surfaces excluding one of the side surfaces 3c of the small pad 3. Note that FIG. 16 is a schematic cross-sectional view for describing a state in which the cushion material 2 is being molded.

Specifically, the lower mold M1, formed in a box shape with a U-shaped section, and the upper mold M2, formed with a step to close an upper opening of the lower mold M1, are combined together in a state in which the small pad 3 and a pad raw material 1b (as an expandable stock solution composition which is a raw material of the pad body 1) are arranged in a space SP between the lower mold M1 and the upper mold M2. Then, the inner temperature of the space SP is increased or the inner pressure of the space SP is decreased. In this manner, the pad raw material 1b is expanded until the space SP is filled with the pad raw material 1b. As described above, the pad body 1 formed integrally with the small pad 3 is formed. The high-stiffness impregnation layer 3a is naturally formed by insert molding with the small pad 3 being impregnated with the pad raw material 1b.

In particular, in the case of not forming the impregnation layer 3a at one of the side surfaces of the small pad 3, the upper mold M2 having a wall M2a protruding toward the space SP is prepared, and the small pad 3 is disposed in the space SP such that the surface of the small pad 3 on which the impregnation layer 3a is not to be formed contacts the wall M2a. Subsequently, the pad raw material 1b is similarly expanded until the space SP is filled with the pad raw material 1b. In this manner, the pad body 1 is formed integrally with the small pad 3. In this manner, the pad raw material 1b does not enter the portion of the small pad 3 contacting the wall M2a, and therefore, does not contact the small pad 3. This can avoid formation of the impregnation layer 3a.

TABLE OF REFERENCE NUMERALS

1: pad body
   1a: air sending path
   1b: pad raw material (expandable stock solution composition)
   1c: front groove
   1d: rear groove
2: cushion material (vehicle seat cushion material)
   2a: through-hole
3: small pad (lower layer)
   3a: impregnation layer
   3b: upper surface (pressure receiving surface, surface)
   3c: side surface
   3d: raised portion
   3e: recessed portion
5: front pad
   5a: through-hole
6: heater
13: small pad
   13a, 13b: corrugated portion
22: cushion material (vehicle seat cushion material)
23: small pad
   23a: impregnation layer
   23b: upper surface (pressure receiving surface, surface)
   23c: side surface (surface)
31: pad body
   31a: longitudinal hole portion
   31b: transverse hole portion
   31x: second ventilation hole
33: small pad
   33a: first ventilation hole
43: small pad
   43a: slit (dividing portion)
51: pad body
52: cushion material (vehicle seat cushion material)
53: small pad
   53a: impregnation layer
   53b: protrusion
63a, 63b, 63c, 63d: protrusion
M1: lower mold
M2: upper mold
   M2a: wall
S: vehicle seat
S1, S11, S21: seat cushion
   S1a: skin material
   S1b: pull-in groove
S2: seat back
   S2a: skin material
   S2b: pull-in groove
SP: space
h: height
t: thickness
w: widthB1

The invention claimed is:

1. A vehicle seat cushion comprising:
a small pad made of resin foam;
a pad body integrally stacked on a pressure receiving surface side of the small pad to cover the small pad, the pad body made of resin foam and formed larger than the small pad;
an impregnation layer
formed in such a manner that the resin foam of one of the small pad and the pad body is impregnated with an expandable stock solution composition of the other one of the small pad and the pad body and formed at at least a portion of an area between the small pad and the pad body;
a front pad that is spaced apart in a front direction relative to the small pad; and
an air sending path that is formed between the pad body and the front pad;
wherein:
the impregnation layer is formed on the pressure receiving surface and a side surface of the small pad;
the small pad is sterically covered with the impregnation layer; and
the front pad and the air sending path are arranged at positions higher than the small pad.

2. The vehicle seat cushion of claim 1, wherein
a surface of the small pad is provided with a plurality of raised portions.

3. The vehicle seat cushion of claim 2, wherein
each protrusion that forms the raised portions is formed in a polygonal sectional shape.

4. The vehicle seat cushion of claim 1, wherein the side surface of the small pad is provided with a plurality of raised portions.

5. The vehicle seat cushion of claim 1, wherein
the small pad is formed with a higher density than that of the pad body.

6. The vehicle seat cushion claim 1, wherein
the small pad is provided with a first ventilation hole, the first ventilation hole being formed to extend through the small pad, and
the pad body is provided with a second ventilation hole, the second ventilation hole communicating with the first ventilation hole of the small pad.

7. The vehicle seat cushion of claim 1, wherein
the small pad is provided with a dividing portion configured to divide the small pad in a seat right-to-left direction.

8. A vehicle seat comprising:
the vehicle seat cushion of claim 1.

9. The vehicle seat of claim 8, wherein the impregnation layer is formed at the side surface of the small pad excluding a front portion of the seat cushion.

10. The vehicle seat cushion of claim 1, wherein a thickness of the front pad is smaller than a thickness of the small pad.

11. The vehicle seat cushion of claim 1, wherein a width of the front pad is larger than a width of the small pad.

12. The vehicle seat cushion of claim 1, wherein a length in a front-to-rear direction of the small pad is smaller than a length in the front-to-rear direction of the front pad.

13. The vehicle seat cushion of claim 1, wherein the air sending path is disposed on a front side of the small pad.

14. The vehicle seat cushion of claim 1, wherein a lower end of a front portion of the front pad is located at a position lower than an upper end of the air sending path.

15. The vehicle seat cushion of claim 1, further comprising:
a front groove that is provide on a surface of the pad body; and
a rear groove that is provided on the surface of the pad body and at a rear of the front groove, wherein the rear groove overlaps the small pad in an up-to-down direction and the front groove does not overlap the small pad in the up-to-down direction.

16. The vehicle seat cushion of claim 15, wherein a rear end of the small pad is located at a rear of the rear groove.

17. The vehicle seat cushion of claim 1, wherein:
a plurality of raised portions is provided on a surface of the small pad; and
a thickness of the small pad is larger than a width of each raised portion of the plurality of raised portions.

18. The vehicle seat cushion of claim 1, wherein a height of the side surface of the small pad is smaller than a thickness of the small pad.

19. The vehicle seat cushion of claim 1, wherein:
a plurality of raised portions is provided on a surface of the small pad; and
an upper end of the side surface of the small pad and a bottom of each raised portion of the plurality of raised portions are positioned at a same height.

* * * * *